March 10, 1942.     A. MAGNANI     2,275,535

CALENDERING MACHINE

Filed Feb. 9, 1937

*Inventor:*
*Alessandro Magnani*
By *Young, Emery & Thompson*
*Attorneys*

UNITED STATES PATENT OFFICE 2,275,535

CALENDERING MACHINE

Alessandro Magnani, Broni, Pavia, Italy, assignor to F. L. Smidth & Co. A/S, Copenhagen, Denmark, a corporation of Denmark Application February 9, 1937, Serial No. 124,942
In Italy February 22, 1936

4 Claims. (Cl. 25—30)

In the manufacture of hollow cylindrical bodies of fibrous cement and the like the compression of the material forming the walls of the body is of great importance when it is necessary to obtain a great compactness and a high mechanical strength. Said compression is generally obtained by means of rollers which are pressed against the surface to be compressed. In order to enhance said pressure, devices have been proposed, tending to strengthen the compressing rollers and to support them at intermediate points to avoid bending.

This invention has for its object to eliminate the mechanical complications inherent to the above devices, yet obtaining equally powerful effects. According to the invention, the tube to be compressed is supported inside by a rigid cylinder turning on its axis, and said tube is compressed by means of one or more cylindrical rollers, whereof the calendering surface is provided with at least one flat helical band the convolutions of which are spaced by a groove sufficiently deep that the bottom thereof cannot enter into contact with the wall of the tube to be compressed. By this way the contact between each compressing roller and the tube to be compressed is limited to the surface of the projecting band of said roller, and the pressure per unit of area on the tube is increased proportionally, the total effort acting on the compression roller being the same.

A pressing machine according to the invention is represented by way of example in the attached drawing, wherein.

Figure 1:
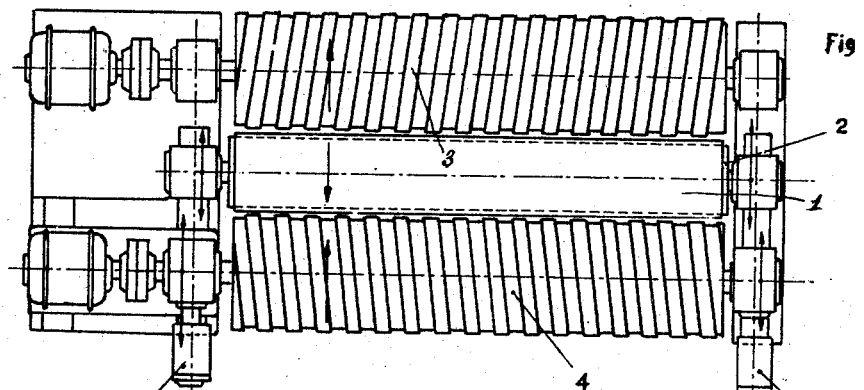
Fig. 1 is a plan view of the pressing machine.
Figure 2:
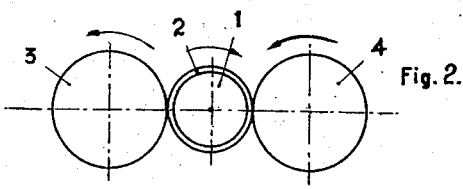
Fig. 2 is a diagrammatic cross section of the same.
Figure 3:
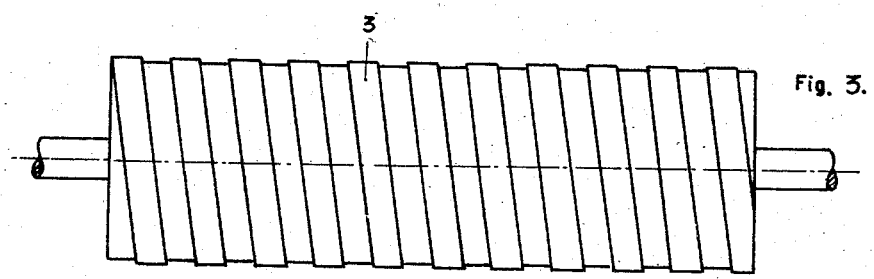
Figs. 3-4 represent details of the helical grooving of the compression rollers.
Figure 4:
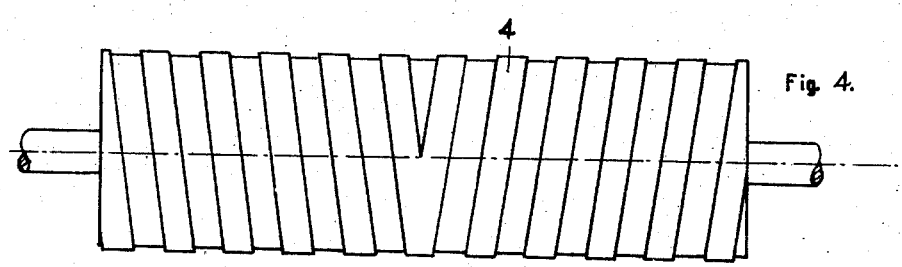

In the machine shown in Fig. 1, tube 1 is supported by a roller 2 turning on its axis, the bearings thereof being movable transversely. The machine also includes a roller 3 which turns on its axis but cannot move transversely, and a roller 4 which turns on its axis and can be displaced transversely by means of two hydraulic cylinders 5—6. The rollers 3 and 4 have their calendering surfaces in the form of flat helical bands or threads, the bottom portions of the grooves between which are out of contact with the tube surface. The operation of this machine is as follows: After having placed the tube to be compressed in position between the turning compression rollers, displacement of the roller 4 is caused by means of the hydraulic cylinders 5—6, said roller being thus pressed against the tube 1 which is held against the roller 3. The operation is continued until the tube has attained a sufficient compactness. The number of the grooved calendering rollers may be any and also the shape and the pitch of the helical thread and groove may vary. In order to avoid axial thrust, it is advisable, for instance, to groove the roller in two portions with reverse helical threads, left and right, as in Fig. 4. When pairs of opposing rollers are used, one of the rollers of each pair may be provided with right-hand threads and the other roller with left-hand threads, as in Fig. 1.

All these different dispositions are of course within the field of the invention.

What I claim is:

1. A machine for calendering tubes and other hollow cylindrical bodies of fibrous cement, comprising a rigid roller mounted for rotation about its own axis and adapted to support the tube internally, and at least one revolving calendering roller adapted to press against the outside of said tube, the calendering surface of said roller consisting of at least one flat helical band of rectangular cross-sectional area the convolutions of which are spaced by a groove of width substantially equal to that of the band and sufficiently deep to prevent the bottom portions thereof contacting with the wall of the tube being calendered, said band extending throughout the length of the roller and the groove formed between the convolutions of the band being of uniform depth.

2. A machine according to claim 1, in which the calendering surface of the compressing rollers comprises a continuous helical band.

3. A machine according to claim 1, in which the calendering surface of each roller is partly a right-handed and partly a left-handed helical band.

4. A machine according to claim 1, in which at least one of the compressing rollers is formed with a left-handed helical calendering band, while at least one other compressing roller is formed with a right-handed helical calendering band.

ALESSANDRO MAGNANI.